US010560354B2

(12) United States Patent
Pignataro et al.

(10) Patent No.: US 10,560,354 B2
(45) Date of Patent: Feb. 11, 2020

(54) END-TO-END, IN SITU PACKET ENRICHMENT FOR NETWORK ANALYTICS

(71) Applicant: Cisco Technology, Inc., San Jose, CA (US)

(72) Inventors: Carlos M. Pignataro, Raleigh, NC (US); Joseph M. Clarke, Raleigh, NC (US); Nagendra Kumar Nainar, Morrisville, NC (US); Lakshmi Ganesh Kondaveeti, Bangalore (IN); Bharath Kumar Gubbala, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 86 days.

(21) Appl. No.: 15/468,949

(22) Filed: Mar. 24, 2017

(65) Prior Publication Data
US 2018/0278548 A1 Sep. 27, 2018

(51) Int. Cl.
H04L 29/06 (2006.01)
H04L 12/26 (2006.01)

(52) U.S. Cl.
CPC .............. H04L 43/08 (2013.01); H04L 69/22 (2013.01)

(58) Field of Classification Search
CPC .......... H04L 29/0653; H04L 29/06095; H04L 49/3009; H04L 49/309; H04L 45/74
See application file for complete search history.

(56) References Cited

U.S. PATENT DOCUMENTS

| 9,306,819 | B2 | 4/2016 | Jocha et al. |
| 9,350,657 | B2 | 5/2016 | Gross, IV et al. |
| 9,456,444 | B2* | 9/2016 | Thubert ............ H04W 72/0446 |
| 9,860,790 | B2* | 1/2018 | Khan .................... H04L 45/308 |
| 2004/0184407 | A1 | 9/2004 | Pok et al. |
| 2011/0128975 | A1* | 6/2011 | Kang .................... H04L 65/605 370/477 |

(Continued)

OTHER PUBLICATIONS

F. Brockners, et al., "Encapsulations for In-band OAM Data", draft-brockners-inband-oam-transport-01, Network Norking Group, Internet-Draft, Jul. 18, 2016, 15 pages.

(Continued)

Primary Examiner — Hassan A Phillips
Assistant Examiner — Prenell P Jones
(74) Attorney, Agent, or Firm — Edell, Shapiro & Finnan, LLC

(57) ABSTRACT

End-to-end, in situ packet enrichment for network analytics includes receiving, at a network device is a part of an end-to-end path in a network, a template that specifies unique information elements to be added to a header of a packet traversing the network device when different combinations of network features are applied to the packet at the network device. When the network device applies one or more of the network features to the packet, the network device inserts one a particular information element of the unique information elements into the header of the packet based on the template and the one or more network features applied to the packet. The particular information element inserted into the header is resolvable to a list of the one or more network features applied to the packet at the network device.

20 Claims, 8 Drawing Sheets

(56) References Cited

U.S. PATENT DOCUMENTS

2015/0124626 A1* 5/2015 Sul .................. H04L 45/50
                                              370/241.1
2016/0020993 A1   1/2016 Wu et al.

OTHER PUBLICATIONS

F. Brockners, et al., "Data Formats for In-band OAM", draft-brockners-inband-oam-data-01, Network Working Group, Internet-Draft, Jul. 18, 2016, 14 pages.

F. Brockners, et al., "Requirements for In-band OAM", draft-brockners-inband-oam-requirements-01, Network Working Group, Internet-Draft, Jul. 18, 2016, 19 pages.

F. Brockners, et al., "Proof of Transit", draft-brockners-proof-of-transit-01, Network Working Group, Internet-Draft, Jul. 18, 2016, 20 pages.

* cited by examiner

END-TO-END, IN SITU PACKET ENRICHMENT FOR NETWORK ANALYTICS

TECHNICAL FIELD

The present disclosure relates to network analysis.

BACKGROUND

Network analysis is typically accomplished with active or passive techniques, such as active operation, administration and maintenance (OAM) or passive OAM techniques. Active OAM techniques add data or functions to a network that are intended to collect information on a hop-by-hop basis, such as Internet protocol service level agreement (IPSLA) data, ping probes, and/or synthetic traffic. However, since active OAM techniques add functions to a network, active OAM techniques do not necessarily capture real behavior of typical traffic (i.e., user or production network traffic) and also add additional overhead to a network. Meanwhile, passive OAM techniques, such as packet captures and network analysis appliances in the network, only provide visibility into a portion of the network (i.e., visibility is restricted to the visibility of a server or a client being utilized by the passive OAM techniques).

By comparison, in-band or in-situ OAM (iOAM) techniques insert or include operational and telemetry information into a packet as the packet traverses a path between two points in a network. Specifically, iOAM enriches actual traffic with additional headers to capture path information as packets of the traffic traverse nodes (i.e., network devices) in a network. iOAM techniques are referred to as "in-band" or "in situ" OAM techniques because the OAM information is carried with the data packets as opposed to in "out-of-band" packets dedicated to OAM. However, iOAM complements out-of-band OAM mechanisms and can utilize various forms of data that can be transported in various protocols (i.e., embedded or encapsulated into a variety of transports).

DESCRIPTION OF EXAMPLE EMBODIMENTS

Overview

Figure 1:
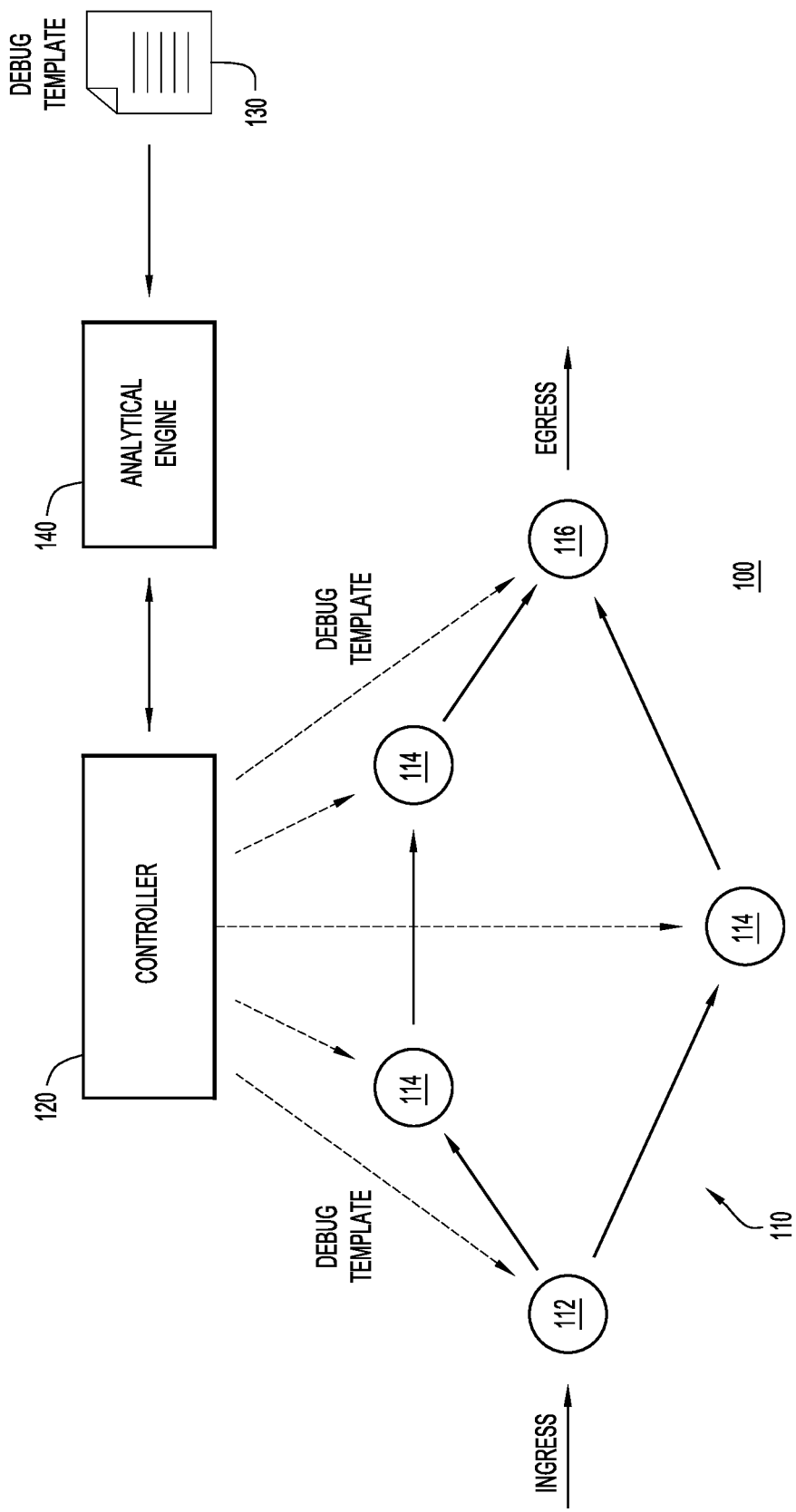
FIG. 1 is a diagram illustrating a networking environment in which the techniques presented herein may be employed, according to an example embodiment.

Techniques are presented herein for enriching packets, in situ, as the packets move end-to-end in a network. These techniques may be embodied as a method, an apparatus, a system, and instructions in a computer-readable storage media to perform the method. According to at least one example embodiment, enriching packets includes receiving, at a network device that is a part of an end-to-end path in a network, a template that specifies unique information elements to be added to a header of a packet traversing the network device when different combinations of network features are applied to the packet at the network device. When the network device applies one or more of the network features to the packet, the network device inserts a particular information element of the unique information elements into the header of the packet based on the template and the one or more network features applied to the packet. The particular information element inserted into the header is resolvable to a list of the one or more network features applied to the packet at the network device.

Example Embodiments

Presented herein are techniques for enriching packets, in situ, as the packets move through an end-to-end network path. More specifically, the packets are enriched by adding information to a header of each packet, such as by utilizing in-band or in-situ operation, administration and maintenance (iOAM) techniques. The added information may indicate the network services or network features that are applied to a specific packet at each hop (i.e., each network device) in a particular network path. This added information may significantly improve the serviceability of the network by facilitating efficient and effective monitoring of the network. Moreover, the information added (i.e., inserted) into the header of a packet may facilitate debugging of a particular network path in the network. For example, each network device within a network may add or insert information related to fields or features that are analyzed and/or utilized when debugging the network into a header of network traffic packet and the resulting collection of information can then be passed to a debugging service for further analysis. Alternatively, fields or features that are utilized for debugging can be conditionally enabled based on trigger conditions detected within an ingress header (i.e., an iOAM header). Among other advantages, enriching packets in-band or in situ (i.e., inserting analytical information into a packet of actual network traffic) provides per-flow granularity and allows control entities in the network and/or engineers monitoring the network to quickly and precisely determine the network features that operated on a particular packet at each hop (i.e., each network device) of a particular path.

Put another way, the techniques presented herein add analytical information to packets on a per-packet basis by adding analytical information to the iOAM header of a packet as the packet moves, end-to-end, through a network. As a result, the techniques presented herein may provide analytical information from any specific path (which may be influenced by load balancing, multi-pathing, etc.). By comparison, conventional solutions are typically focused on gathering performance information on a per-device basis. Additionally, conventional iOAM techniques are more informational in nature and typically only provide path information, performance metrics, and proof of transit verification, while the techniques provided herein insert analytical information that can be utilized for debugging. Consequently, in at least some instances, the techniques provided herein may be utilized to provide debugging as a service.

Reference is first made to FIG. 1 for a description of a network environment 100 in which the techniques presented herein may be employed, according to at least one example embodiment. The network environment 100 includes a network 110 that is formed by a plurality of network devices (i.e., routers and/or switches, an example of which is described in further detail below in connection with FIG. 7). More specifically, in FIG. 1, the network 110 includes an ingress network device 112, an egress network device 116, and a plurality of transit network devices 114 disposed and operatively connected therebetween. The transit network devices 114 provide a number of network paths through the network 110 (i.e., paths from the ingress network device 112 to the egress network device 116). For simplicity the paths referred to herein are discussed as paths including hops between network devices; however, the hops included on each path may not be strictly to and from network devices. For example, a hop may be to or from a particular network device, a piece of software, a network function, and/or a service function chain.

A controller 120 is operatively coupled to the plurality of network devices (i.e., ingress network device 112, transit network devices 114, and egress network device 116) and configured to, among other things, provision the plurality of network devices with a debug template 130 that defines how information should be added to packets traversing network 110. For example, the template 130 may specify unique information elements (i.e., metadata values or identifiers) that should be added to an iOAM header of a packet based on actions performed at or during a particular hop (i.e., at a particular network device), as is described in further detail below. As is also explained in further detail below, the information (i.e., metadata) added to the iOAM header may vary in different instances (i.e., on a per-use basis), but as some illustrative examples, the information may identify features applied to a packet (i.e., Quality of Service (QoS), Access Control Lists (ACLs), Network Based Application Recognition (NBAR), Network Address Translation (NAT)), an ingress timestamp, and/or process related information.

In the depicted example, the controller 120 is a central entity in the network 110; however, in other embodiments, the controller 120 may be distributed and include parts or portions that are co-located with the plurality of network devices included in network 110. Moreover, the controller 120 is provided as one example entity that can provision the network devices with a template 130, but, in other embodiments, the network devices in network 100 could be programmed in any way, such as with Segment Routing instructions. That being said, for simplicity, the entity that programs the plurality of network devices included in network 110 is referred to herein as controller 120.

Once the controller 120 provisions the plurality of network devices included in network 110, each network device will be able to add specific analytical information (i.e., metadata) to each packet traversing the network device (and/or respond to specific information included in a header of a packet). Consequently, when a packet arrives at the egress network device 116, the packet will have accumulated information (i.e., metadata) from one or more network devices traversed by the packet. In some instances, every network device (or other such entity supporting a hop) on an end-to-end path traversed by a packet inserts analytical information into a header of the packet, but in other instances, only some of the network devices (or other such entities supporting a hop) on the end-to-end path traversed by the packet insert analytical information into the header of the packet. Regardless, the analytical information accumulated by the packet while traversing the end-to-end path provides valuable analytical insight into how a packet was switched and the feature-set applied to the packet as the packet was switched.

In at least some examples, the egress network device 116 may decapsulate the information added to the header (i.e., the iOAM header) of a particular packet and forward the information to an analytical engine 140. The analytical engine 140 may also have or obtain the debug template 130 and, thus, can analyze the analytical information added to the iOAM header. In at least some of these instances, the underlying network 110 may be operating in accordance with normal operating procedures and the debugging analysis may be provided as a cloud-based service (i.e., the analytical engine 140 may reside in the cloud and provide debugging services based on the information retrieved from the decapsulated header). Additionally or alternatively, the information included in the iOAM header of a packet at the egress network device 116 may be by analyzed by the controller 120 (i.e., to provide an in-network solution) or another similar entity.

Figure 2A:
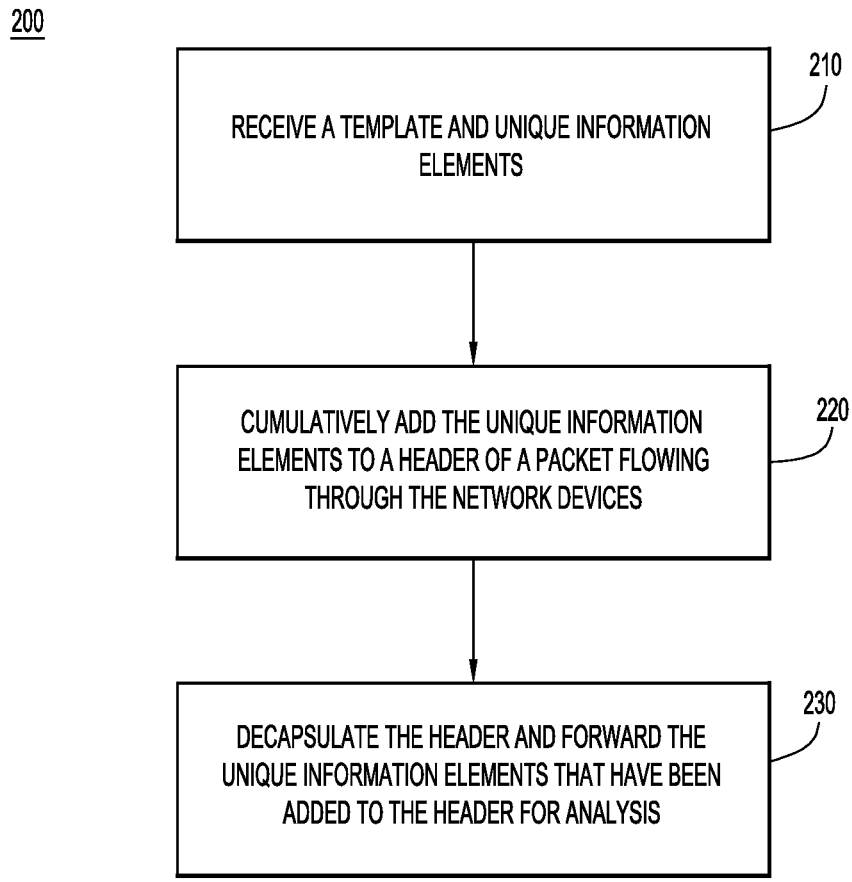
FIG. 2A is a high-level flowchart illustrating a method for enriching packets, in situ, as the packets move through an end-to-end network path from the perspective of a particular network device in the network, according to an example embodiment.

Referring next to FIG. 2A for a description of a high-level flow chart of a method 200 depicting operations performed by a plurality of network devices in a network to enrich packets as the packets move through an end-to-end network path in the network. Reference is also made to FIG. 1 for the purposes of the description of FIG. 2A. Initially, at 210, each of the network devices receives a template, such as an iOAM template. For example, the network devices in network 110 receive debug template 130 from controller 140. The template specifies the relationship between unique information elements (i.e., metadata identifiers) and at least some features that the plurality of network devices may apply to packets traversing the network (i.e., network devices actions performed while switching or routing the packets through the network). As is explained below in connection with FIG. 3, in some instances, the network devices may not actually receive the template and, instead, the network devices will be informed of the template's location. In these instances, the network devices can look up (i.e., fetch) information (such as the information elements) from the template when required. This configuration may be beneficial when the network devices only add information elements to the header of a packet in response to satisfaction of a trigger condition (since the template is used when the trigger condition is satisfied, as opposed to being used for every packet).

At 220, the network devices can perform proactive or reactive activities to iteratively or cumulatively insert analytical information into headers of packets traversing the network. More specifically, one or more of the plurality of network devices can cumulatively or iteratively add unique information elements (i.e., metadata identifiers) to a header of any packet (i.e., an iOAM header) traversing an end-to-end path in the network. The information elements are added based on the template, which allocates specific information elements to specific network features, as is described in further detail below. Since the information elements are allocated (i.e., mapped or assigned) to different network features, the information elements add analytical information to the packets as the packets traverse the network, which may, in essence, provide debugging analytics as a service. That is, the information elements (i.e., metadata identifiers) added at a particular hop (i.e., by a particular network device) represent any features or actions applied to the packet at that hop (i.e., by that particular network device). As is described in further detail below, the information elements are each resolvable to indicate (i.e., provide a list) which features were applied or which actions were taken at each hop included in the network path of a specific packet.

As a more specific example, each of the plurality of network devices in a network may augment iOAM headers included in packets traversing the network by adding a single metadata quantifier or identifier to the iOAM header, based on the template (which the controller provisions to the network devices). Thus, as the packet traverses network devices, each network device may add device-specific information to the iOAM header of the packet. Alternatively, in other examples, network devices may only iteratively add information to the iOAM header of a packet when a certain trigger condition is satisfied. For example, when a certain trigger condition is satisfied, a query-flag will be included in the iOAM header that allows network devices to add information (i.e., metadata) to packets as the packets flow through an exact path (i.e., the rendered service path for service function chaining traffic). The trigger condition can be set manually (i.e., by an operator or network engineer) for troubleshooting purposes or can be event triggered by any event, such as time to live (TTL) expiry, congestion drop, etc. An example trigger condition is discussed in detail below in connection with FIG. 6.

Figure 2B:
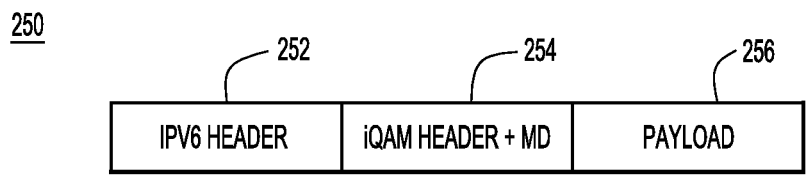
FIG. 2B is a diagram depicting an egress packet that exits the network, according to an example embodiment.

Reference is made briefly to FIG. 2B for a description of the general structure of an enriched packet 250. An enriched packet 250 may include an Internet Protocol Version 6 (IPV6) Header 252 (or some other communication protocol header, such as a segment routing header (SRH)), an iOAM header 254, and a payload 256. In the aforementioned example that is based on an iOAM template, the network nodes add information elements to the packets by inserting metadata (represented as "MD") into the iOAM header 254.

Returning back to FIG. 2A, at 230, an egress network device of the network decapsulates the header that contains the information elements (i.e., iOAM header 254) and forwards the information (i.e., metadata) included therein for analysis (i.e., to the controller 120 or the analytical engine 140). In some instances, the forwarded information may be aggregated across multiple paths, provided that network device or per-hop granularity (i.e., node granularity) is maintained (i.e., the association between specific information and a specific network device or hop remains intact). Then, a query may be executed against the analytical data (i.e. data beyond only the path information) collected in iOAM headers of packets traversing the network to facilitate debugging operations. For example, a network engineer (or analytical engine 140) may execute a query to determine the actions performed (by the network devices in a specific end-to-end network path) on a specific flow/packet as part of a feature treatment on the packet. Due, at least in part, to the feature and network device granularity, the analytical information inserted or added to packets by these techniques provides valuable insight into how a packet was processed and the feature-set that was applied during the processing. This information is particularly useful for debugging. For example, the analytical information may allow the controller 120, the analytical engine 140, and/or a user (i.e., a network engineer) to query information for all of the features applied to a packet by the network devices in a specific network path and/or information for one or more specific features applied to a packet at one or more hops (i.e., one or more network devices) in a specific network path.

Figure 3:
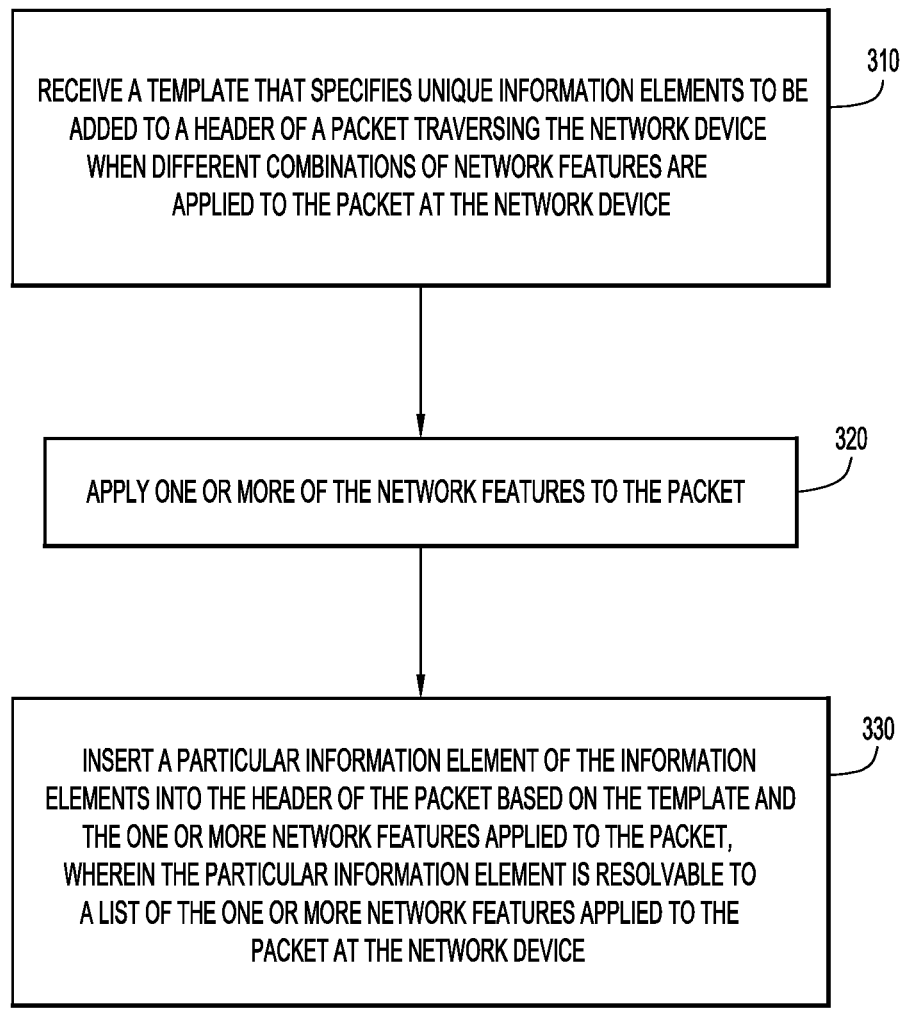
FIG. 3 is a high-level flowchart illustrating a method for enriching packets, in situ, as the packets move through an end-to-end network path from the perspective of the network devices in a particular path in the network, according to an example embodiment.

Now referring to FIG. 3 for a description of a high-level flow chart of a method 300 including operations performed by a particular network device in a network to enrich packets as the packets move through an end-to-end network path that includes the particular network device. Reference is also made to FIG. 1 for purposes of the description of FIG. 3. Initially, at 310, a particular network device is informed of a template that specifies unique information elements to be added to a header of a packet traversing the network device when different combinations of network features are applied to the packet at the network device. For example, the template may by a template that specifies unique information elements to be added to an iOAM header of a packet when different combinations of network features are applied to the packet at the network device. As mentioned above, in some instances, the particular network device receives the template and stores the template locally when the network device is informed of the template. However, in other instances, the particular network device does not receive the template. Instead, controller 140 may inform the particular network device of the template's location and instruct the particular network device to fetch information from the template as the particular network device processes packets therethrough.

Regardless of how the template is provisioned, the information elements included in the template are unique metadata identifiers that add feature rich details to the packet. For example, different metadata identifiers may be assigned to different network features that are frequently utilized when debugging the network. Then, features may be added to packets by each of the network devices in a particular end-to-end path. The metadata identifiers turn string values (i.e., JavaScript Object Notation (JSON) or extensible markup language (XML) textual representations of, for example, QoS parameters applied at a certain network device) into a compressed value or information element, so that the information element associated with a particular feature is binary or numeric and machine readable. Example information elements (i.e., metadata identifiers) are described below in connection with operation 320.

At 320, the network device applies one or more network feature to the packet. In other words, the network device operates in a normal manner, handling (i.e., routing and/or switching) traffic, such as database or web traffic, in accordance with normal operating procedures for that particular network device. In some instances, these operations involve applying a feature or set of features to the packet, including but not limited to QoS, ACL, NBAR, and/or NAT.

However, in addition to operating procedures, the network device may also insert information into the packet, as indicated at 330, as or after the network device applies the one or more features (i.e., 320 and 330 may occur simultaneously). More specifically, at 330, the network device inserts one of the unique information elements into a header of the packet, such as the iOAM header, based on the template and the features applied (or other actions taken) by the network device (at 320). That is, the network device inserts the information element(s) specified by the template for the particular feature(s) applied to the packet by the network device. Each information element is unique so that each information element provides a clear indication of a particular feature that was applied to the packet at the network device (i.e., element "A"=QoS). Consequently, the information element is resolvable, based on the template, to provide a list of the one or more network features applied to the packet at the network device.

The information element inserted into the header of the packet remains resolvable when multiple features are applied to the packet. In some instances, a different information element is assigned or mapped to any possible combination of features to provide the specificity to resolve an information element to multiple features. Alternatively, the unique information elements assigned or mapped to each feature may be combinable to create unique combinations. That is, two or more information elements can be combined to produce an information element that is a specific combination. For example, if a first information element is combined with a second information element, the resultant information element will be resolvable to provide a list that only includes the first information element and the second information element (and, thus, a list of a first network feature and a second network feature that correspond to the first and second information elements, respectively).

More specifically, in certain embodiments, each information element is a prime number and information elements are combined by multiplying information elements together. Consequently, the factors of the combination (the product) will include the unique information elements used to generate the combination (the product). As a more specific example, consider a scenario where a template assigns the following features to the following prime numbers: NBAR=2; QoS=3; ACL=5; and NAT=7. With these mappings, if a particular network device applies QoS parameters and an ACL to a packet, the network device may insert the information element "15" (3×5) into a header of the packet (i.e., the iOAM header). Then, at egress, the analytical engine 140, controller 120 and/or a network engineer may quickly determine, based on the "15" included in the iOAM header, that the particular network device applied QoS and ACL to the packet. However, in other embodiments, the combinations may be formed by appending two unique identifiers together (i.e., an identifier X and an identifier Q can be combined as XQ), creating a polynomial that is only resolvable to a specific combination of information elements (i.e., the information elements 4 and 3 can be combined into the equation (x−4)(x−3)=0, which is otherwise stated as $x^2-7x+12=0$ and resolves to x=3 and x=4), or any other manner.

However, the example provided above is only provided for illustrative purposes and, in different instances, the granularity of the template may be adjusted to provide any specific analytical information. For example, in some instances, any ACL may be associated with the same identifier, but in other instances, different ACLs may be associated with different identifiers. Put broadly, the iOAM template may provide feature granularity that allows the controller 120, the analytics engine 140, and/or a user (i.e., a network engineer) to query more details for any applied features, specific features of interest (i.e., a particular ACL), and/or features applied with certain parameters.

The granularity of the template may also be adjusted across nodes to allow the controller 120, the analytics engine 140, and/or a user (i.e., a network engineer) to gather analytical information on particular features from all hops (i.e., all transit network devices) or selective hops (i.e., selective network devices) along an end-to-end network path. For example, in the aforementioned scenario where the template defines a mapping of features to prime number information elements (i.e., NBAR=2; QoS=3; ACL=5; and NAT=7) for a particular node, the same template can be provisioned to all network devices in a network or the template may be adjusted (or replaced) for different network devices. For example, NAT function on Router-A may be mapped to the information element "7" while NAT function on Router-B is mapped to the information element "11."

When the template differs for different network devices, the network devices may be identified based on their template. However, if the same template is utilized across multiple nodes, some indication may be included in or with the information elements to allow each information element to be easily matched to its network device. For example, in some instances, each network device may be assigned or mapped to a particular identifier or value that can be included in the information element. (i.e., if Router-A=11 and applies QoS, which is mapped to 3, the information element inserted by Router A may be 33). Alternatively, the information elements may be incorporated into a polynomial that associates each information element with a particular hop on a network path (i.e., a particular network device, a piece of software, a network function, a service function chain, etc.), on a hop-by-hop basis. Regardless of how information element are matched to a particular hop, this information may allow the controller 120, the analytics engine 140, and/or a user (i.e., a network engineer) to easily gather analytical information on particular features from all hops (i.e., all transit network devices) or selective hops (i.e., selective network devices) along the path. The different techniques may offer a tradeoff between detail and size. Said another way, information elements are added to a packet header on a per-hop basis and organized in a manner that allows an entity (i.e., an engineer, the controller 120, and/or the analytical engine 140) to precisely determine the exact network features that operated on a particular packet at each hop (i.e., network device) in a particular network path (i.e., the feature path is recorded).

Figure 4:
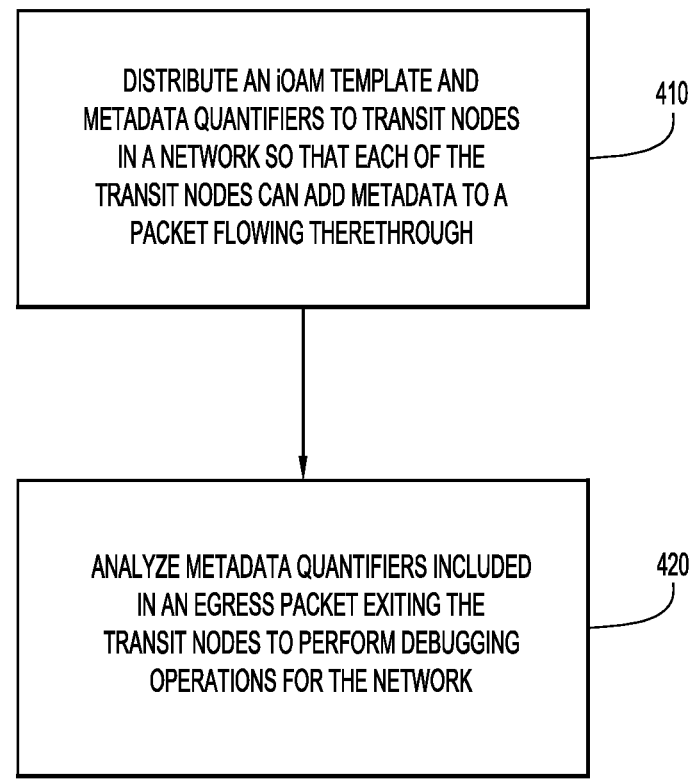
FIG. 4 is a high-level flowchart illustrating a method for enriching packets, in situ, as the packets move through an end-to-end network path from the perspective of a controller in communication with the network devices in the network, according to an example embodiment.

Now referring to FIG. 4 for a description of a high-level flow chart of a method 400 performed by a controller in communication with a plurality of network devices in a network to enrich packets as the packets move through an end-to-end network path in the network. Initially, at 410, the controller signals an iOAM template and metadata quantifiers to transit network devices in a network so that each of the transit network devices can add information elements (i.e., metadata) to a packet flowing therethrough. This template causes the network devices to perform the operations described above in connection with FIGS. 2A and 3. Then, at 420, the controller analyzes metadata quantifiers included in an egress packet exiting the transit network devices to perform debugging operations for the network or otherwise enhance the serviceability of the network.

Figure 5:
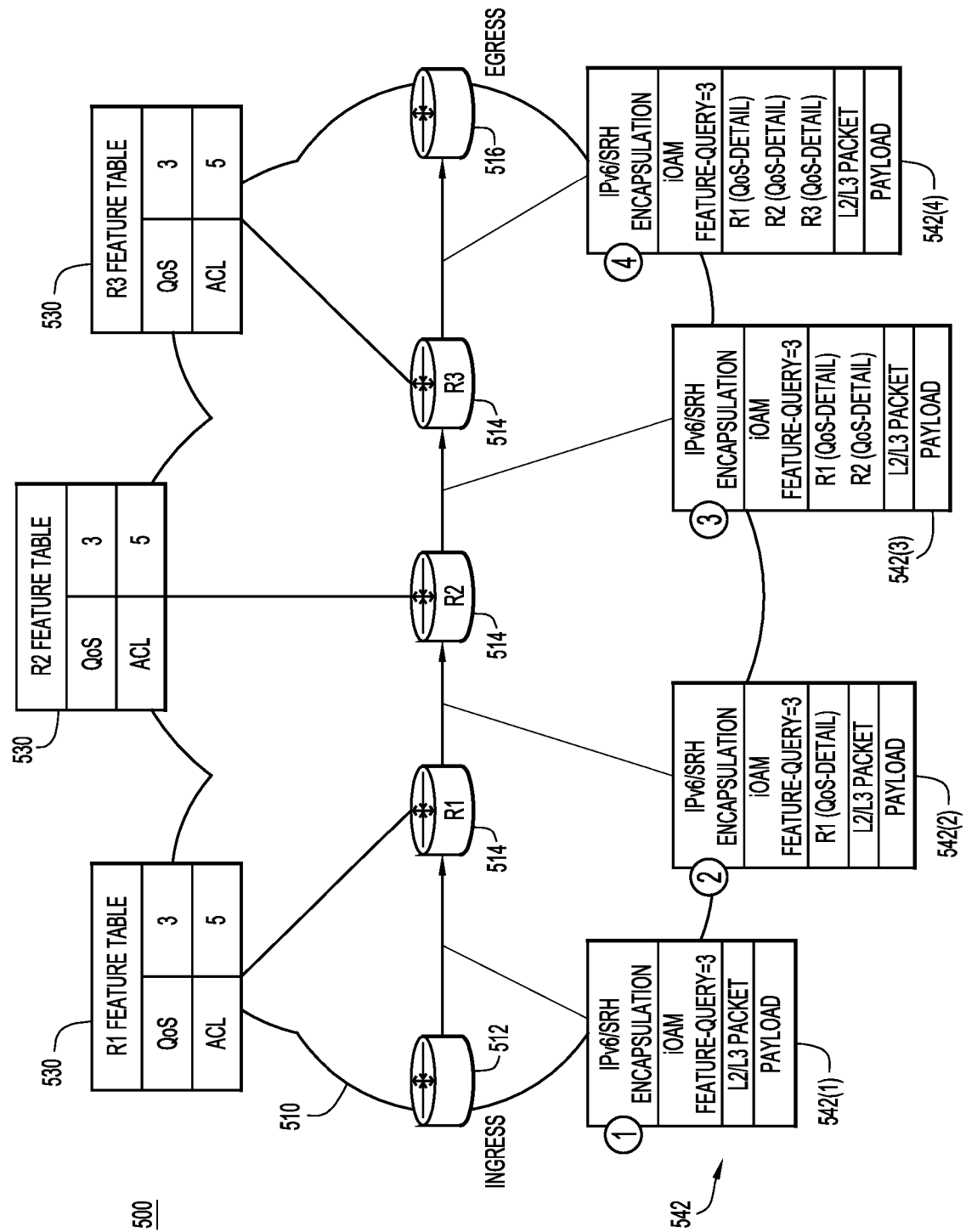
FIG. 5 is a diagram depicting debugging operations enabled by the techniques presented herein, according to an example embodiment.
Figure 6:
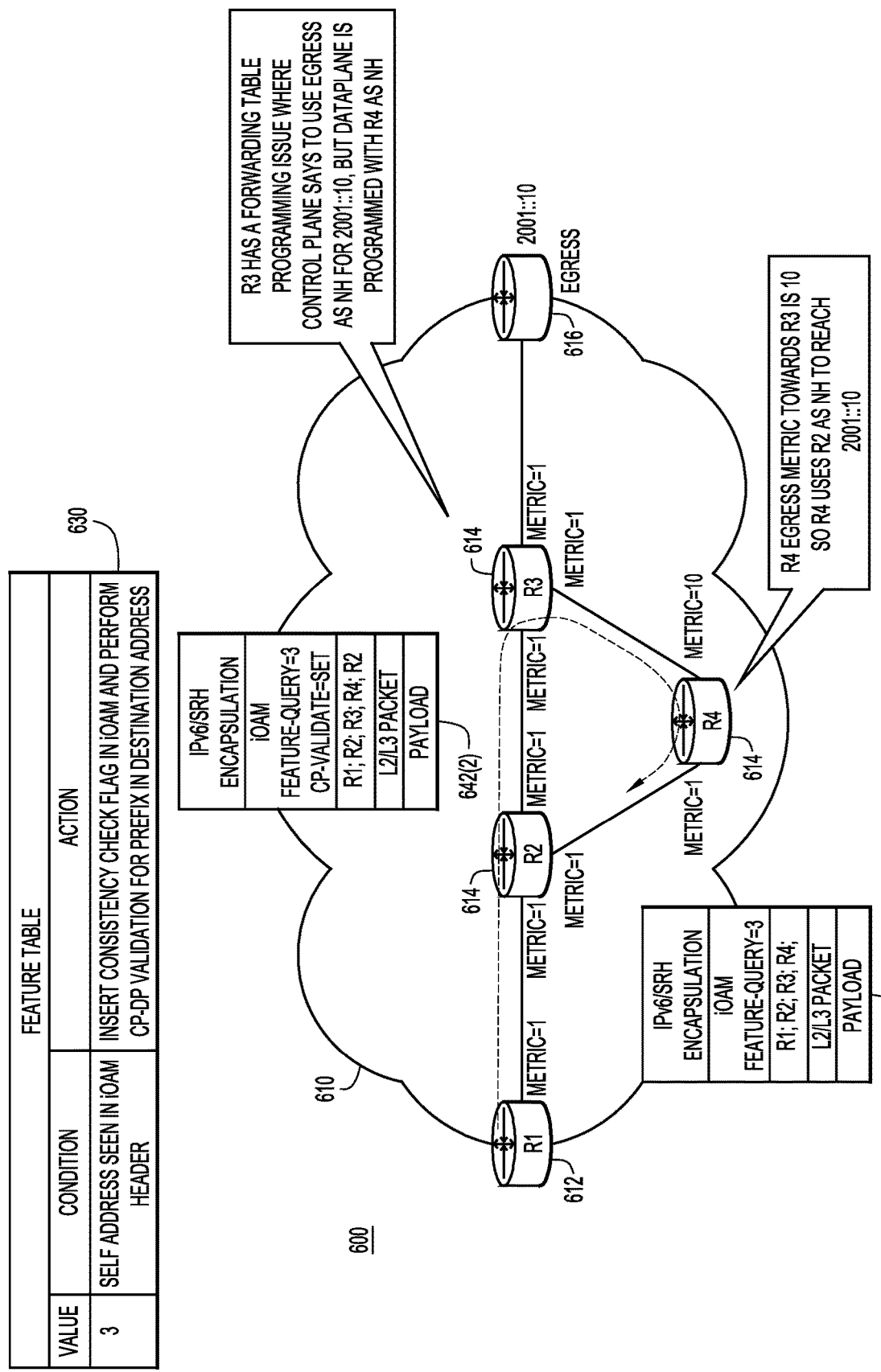
FIG. 6 is a diagram depicting debugging operations enabled by the techniques presented herein, according to another example embodiment.

Now turning to FIGS. 5 and 6, two examples are shown of debugging operations based on the packet enrichment techniques presented herein. Generally, in FIG. 5, the debugging operations utilize a manually generated query to cause the network devices to insert information about a particular feature into a packet. By comparison, in FIG. 6, the debugging operations are commenced in response to a condition being detected in the packet and, thus, one or more networking devices insert information into the packet upon detecting a trigger condition.

Referring specifically to FIG. 5, example embodiment 500 involves a network 510 with an end-to-end network path that traverses an ingress network device 512, three transit network devices 514 (R1, R2, and R3), and an egress network device 516. Each of the network devices in this end-to-end path has been provisioned with template 530, which specifies that the information element "3" corresponds to QoS and the information element "5" corresponds to an ACL. Consequently, an operator interested in collecting the QoS behavior at each hop for a specific flow can execute a feature query for "3" by inserting "feature-query=3" in the iOAM header for the flow. Each hop will then include the action details for QoS in the iOAM header that will be decapsulated at egress for processing (centrally or locally).

More specifically, as is shown at depictions of packet 542 displayed at 542(1)-542(4), QoS detail is added to the packet 542 on a hop-by-hop basis. Initially, at ingress, the packet 542 does not have any QoS detail, but, includes the query 'feature-query=3, as shown at 542(1). Then, at the first transit network device 514 (R1), a first QoS detail ("R1 (QoS-detail)") is added to the packet 542, as shown at 542(2). Similarly, at the second and third transit network devices 514 (R2 and R3), a second QoS detail ("R2(QoS-detail)") and a third QoS detail ("R3(QoS-detail)") are added to the packet 542, as shown at reference numerals 542(3) and 542(4), respectively. Consequently, at the egress node 516, the packet 542 includes action details for the QoS applied at each network device in the network path. Although the location of these details is not clearly shown in FIG. 5, it is to be understood that these details are included in the iOAM header (i.e., iOAM header 254 from FIG. 2B) of the packet.

In FIG. 6, example embodiment 600 includes a network 610 with an end-to-end network path that traverses an ingress network device 612, three transit network devices 614 (R2, R3, and R4), and an egress network device 616. Each of the network devices in this end-to-end path has been provisioned with template 630, but, in this instance, the template 630 specifies that the information element "3" corresponds to a trigger condition and an action. In particular, template 630 specifies that the information element "3" indicates that a flag should be inserted into an iOAM header of a packet that indicates that the network node should validate the control plane (CP) against the data plane (DP) for a prefix in destination address (i.e., the action is performing CP-DP validation) if the address of that particular network device (i.e., "self address") is already seen in the iOAM header (the trigger condition). This particular action can be performed for all prefixes or just the prefix in destination address of the header and may help in scenarios where a loop is detected. However, this action is just an example and, in other instances, other actions and trigger conditions may be utilized. For example, an action to include QoS-action details in the iOAM header can be triggered by a trigger condition of a QoS violation (or latency violation, previous hop is (or is not) a certain value (i.e., as determined by existing iOAM headers), etc.) being detected (as the action).

In FIG. 6, the second transit network device 614 (node R3) has a programming corruption causing traffic to 2001:: 10 to be forwarded to R4 instead of egress. More specifically, node R3 has a forwarding table programming issue where the CP lists egress 616 as the next hop for 2001::10, but the DP is programmed with node R4 as the next hop. Consequently, node R3 will forward a packet to node R4. At node R4, the packet will contain a listing of previous hops in the iOAM header, as shown at 642(1), but, in the depicted scenario, node R4 will forward the packet to node R2 (again) as the next hop to reach 2001::10 because the egress metric towards R3 is 10 and the egress metric towards node R2 is 1. Node R2, on receiving the packet a second time, observes that node R2 is already in the iOAM header, as illustrated at 642(2) and, thus, the packet satisfies the trigger condition when it arrives at node R2 for a second time. Due to the conditional reaction listed in template 630, node R2 inserts an information element that corresponds to a consistency check flag (i.e., information element "3"), performs CP-DP validation for the prefix in destination address of the packet, and forwards the packet (however, R2 is not required to hold the packet for the validation result and, thus, will not introduce any delays). The consistency flag will indicate that node R2 performed the CP-DP validation. However, in other instances, any transit network device 614 will perform the same validation if the trigger condition is satisfied. This will help detect and/or fix/rectify the programming corruption issue at the data plane level itself.

In at least some embodiments, the iOAM header carries instructions that will be conditionally evaluated based on an occurrence of certain events (i.e., based on satisfaction of a trigger condition). For example, in at least some embodiments, the iOAM header may carry information included in template 630 or a portion thereof. This information may be added at the source of the packet or midstream. Regardless, a transit network device 614 will follow the instruction(s) of the action in the iOAM header if the trigger condition is satisfied. Functionally, the trigger condition and action can be specified in the iOAM header using either a mapping system (i.e., a template) or using embedded logic encoded in, for example, Binary JSON (BSON). When the action is dependent on information that is collected or added to the packet as the packet traverses the network path (i.e., information added to a field in the iOAM header), the condition may be referred to as an active condition. However, the condition need not be an active condition and, in some implementations, the action may be applied based on the presence of a static condition. A static condition is configured on the device without additional input from the iOAM header. Regardless of whether the condition is active or static, satisfaction of a trigger condition causes the related action to be performed. The action is looked up in a map (i.e., a template) either locally on the network device or fetched remotely from a controller. Alternatively, the condition and action may be included within the payload; however, the result is the same: the network device tests the condition, and if true, performs the specified action on the packet (which may include inserting information, such as a flag, into the iOAM header of the packet).

Figure 7:
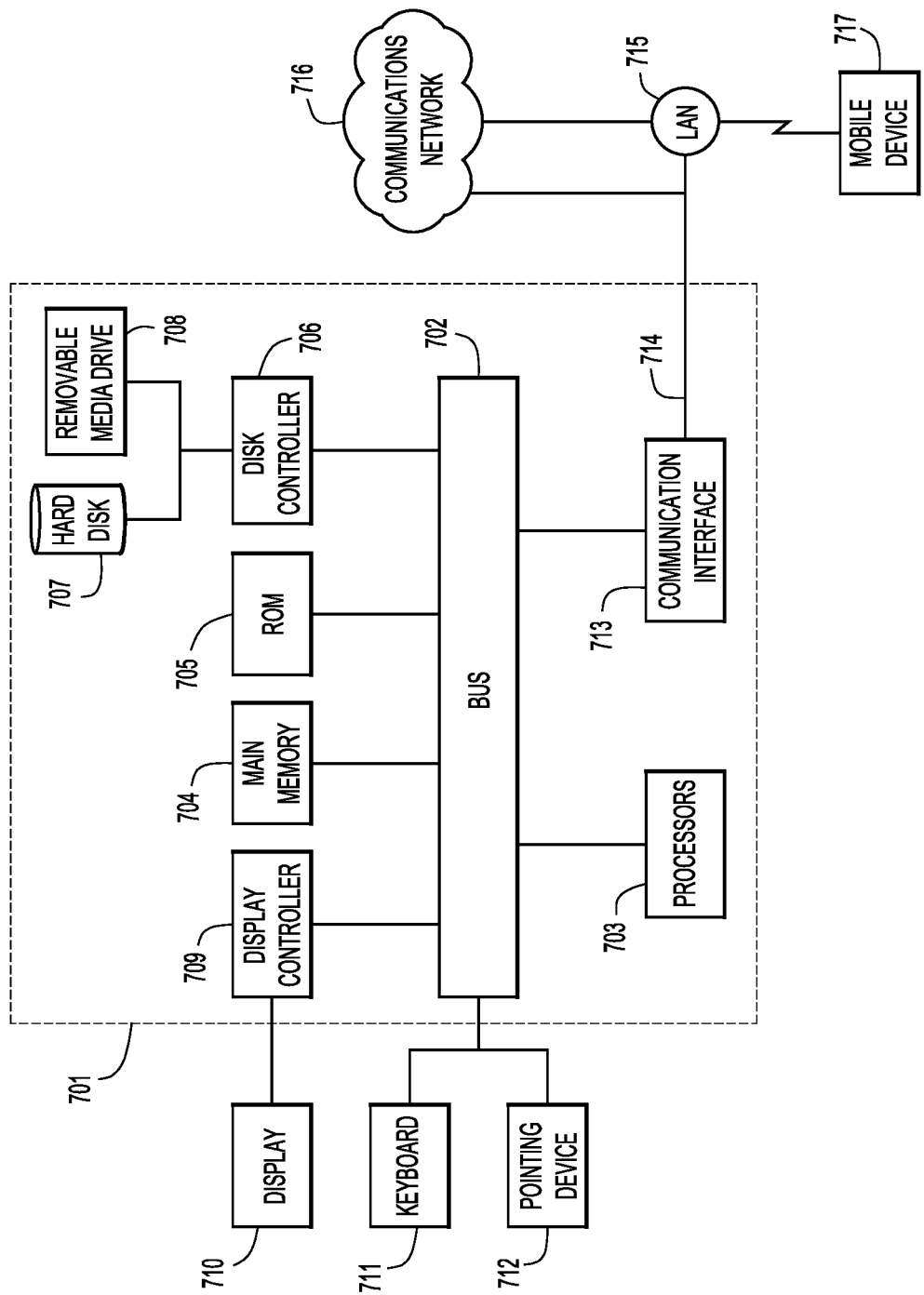
FIG. 7 is a block diagram depicting a computer system upon which the techniques presented herein may be implemented, according to an example embodiment.

Now referring to FIG. 7 for a description of a computer system 701 upon which the controller, analytical engine, and other computing elements presented herein may be implemented. The computer system 701 may be programmed to implement a computer based device, such as a device displaying a user interface, executing one or more physical or virtual service chain elements, such as the service chain elements of FIG. 1. The computer system 701 includes a bus 702 or other communication mechanism for communicating information, and a processor 703 coupled with the bus 702 for processing the information. While the figure shows a single block 703 for a processor, it should be understood that the processors 703 represent a plurality of processing cores, each of which can perform separate processing. The computer system 701 also includes a main memory 704, such as a random access memory (RAM) or other dynamic storage device (e.g., dynamic RAM (DRAM), static RAM (SRAM), and synchronous DRAM (SD RAM)), coupled to the bus 702 for storing information and instructions to be executed by processor 703. In addition, the main memory 704 may be used for storing temporary variables or other intermediate information during the execution of instructions by the processor 703.

The computer system 701 further includes a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, tape drive, and removable magneto-optical drive, optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 701 may also include a display controller 709 coupled to the bus 702 to control a display 710, such as liquid crystal display (LCD), or a light emitting diode (LED) display, for displaying information to a computer user. The computer system 701 includes input devices, such as a keyboard 711 and a pointing device 712, for interacting with a computer user and providing information to the processor 703. The pointing device 712, for example, may be a mouse, a trackball, or a pointing stick for communicating direction information and command selections to the processor 703 and for controlling cursor movement on the display 710. The pointing device 712 may also be incorporated into the display device as, for example, a capacitive touchscreen and/or a resistive touchscreen.

The computer system 701 performs a portion or all of the processing steps of the invention in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 701, for driving a device or devices for implementing the invention, and for enabling the computer system 701 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a wired or wireless network interface card to attach to any packet switched (wired or wireless) LAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local are network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc.). The signals through the various networks and the signals on the network link 714 and through the communication interface 713, which carry the digital data to and from the computer system 701 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 701 can transmit and receive data, including program code, through the network(s) 715 and 716, the network link 714 and the communication interface 713. Moreover, the network link 714 may provide a connection through a LAN 715 to a mobile device 717 such as a personal digital assistant (PDA) laptop computer, or cellular telephone.

Figure 8:
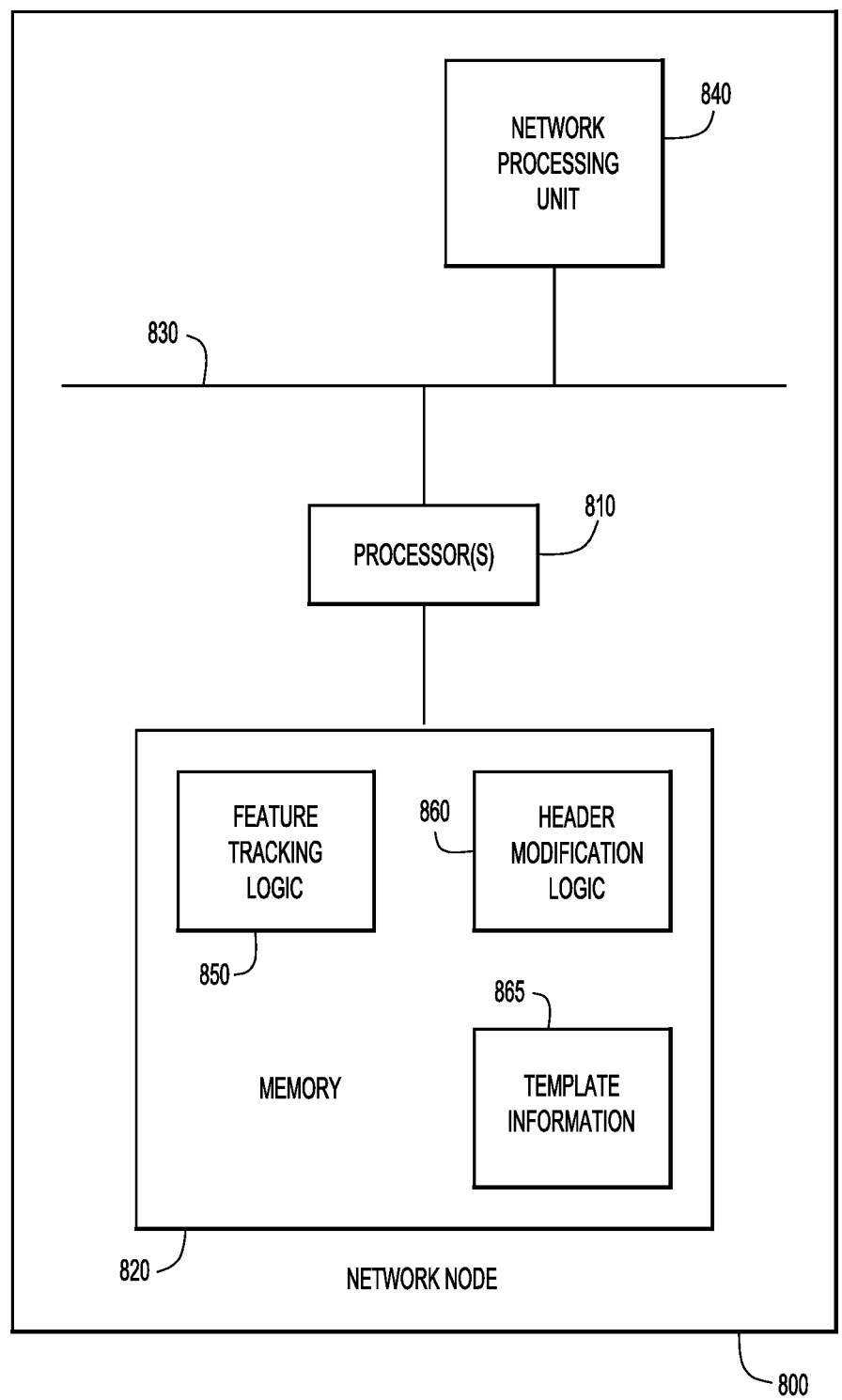
FIG. 8 is a block diagram of a network device configured to participate in the techniques presented herein, according to an example embodiment.

Now referring to FIG. 8, an example block diagram is shown of a network device or network node 800, e.g., any of the network devices 114, 116, 118) shown in FIG. 1, configured to participate in the techniques presented herein. The network device 800 includes one or more processors 810, memory 820, a bus 830 and a network processor unit 840. The processor 810 may be a microprocessor or microcontroller. The network processor unit 840 may include one or more ASICs and facilitates network communications between the network device 800 and other network nodes as well as the controller 120, and includes a plurality of network ports (not shown) from which to receive packets in a network and to which it routes packets into the network. The processor 810 executes instructions associated with software stored in memory 820.

Specifically, the memory 820 stores instructions for feature tracking logic 850 that, when executed by the processor 810, cause the network device to track any features applied to a packet traversing that network device, according to the operations described herein. The memory 820 also stores header modification logic 860 that, when executed by the processor 810, cause the network device to, based on template information 865 received (or fetched) from the controller, adds or inserts information elements into a header of a packet traversing that network device, according to the operations described herein. It should be noted that in some embodiments, the feature tracking logic 850 and/or the header modification logic 860 may be implemented in the form of firmware that is processed by ASICs, which may be integrated into a circuit board. Alternatively, the feature tracking logic 850 and/or the header modification logic 860 may be in the form of one or more logic blocks included in a programmable logic device (e.g., a field-programmable gate array).

The memory 820 may include ROM, RAM, magnetic disk storage media devices, tamper-proof storage, optical storage media devices, flash memory devices, electrical, optical, or other physical/tangible memory storage devices. In general, the memory 820 may comprise one or more tangible (non-transitory) computer readable storage media (e.g., a memory device) encoded with software comprising computer executable instructions and when the software is executed (by the processor 810) it is operable to perform the operations described herein.

To summarize, in one form, a method is provided comprising: receiving, at a network device is a part of an end-to-end path in a network, a template that specifies unique information elements to be added to a header of a packet traversing the network device when different combinations of network features are applied to the packet at the network device; applying one or more of the network features to the packet; and inserting a particular information element of the unique information elements into the header of the packet based on the template and the one or more network features applied to the packet, wherein the particular information element inserted into the header is resolvable to a list of the one or more network features applied to the packet at the network device.

In another form, a system is provided comprising: a plurality of network devices providing one or more end-to-end paths in a network and configured to apply one or more network features to packets traversing the one or more end-to-end paths; and a controller configured to: provision the plurality of network devices with a template that specifies unique information elements to be added to headers of the packets when different combinations of network features are applied to the packet; and cause a particular network device of the plurality of network devices to insert a particular information element of the unique information elements into the header of one of the packets based on the template and particular network features of the one or more network features applied to the packet at the particular network device, wherein the particular information element is resolvable to a list of the particular network features applied to the packet at the particular network device.

In yet another form, one or more non-transitory computer-readable storage media is provided encoded with software comprising computer executable instructions and when the software is executed operable to: receive a template that specifies unique information elements to be added to a header of a packet traversing a network device that is a part of an end-to-end path in a network when different combinations of network features are applied to the packet at the network device; apply one or more of the network features to the packet; and insert a particular information element of the unique information elements into the header of the packet based on the template and the one or more network features applied to the packet, wherein the particular information element inserted into the header is resolvable to a list of the one or more network features applied to the packet at the network device.

In still another form, an apparatus is provided comprising a network interface unit, and a processor, wherein the processor is configured to: provision a plurality of network devices in a network with a template that specifies unique information elements to be added to a header of a packet at one or more of the plurality of network devices when different combinations of network features are applied to the packet as the packet traverses an end-to-end path through the network; and cause the one or more network devices to insert one of the unique information elements into the header of the packet based on the one or more particular network features applied to the packet at that particular network device and the template, wherein the one unique information element is resolvable to a list of the one or more network features applied to the packet at that particular network device.

A number of advantages are achieved via the methods, system, device(s) and computer readable media described herein. For example, since the techniques presented herein insert information (i.e., metadata) into actual traffic, the techniques provide analytical information for real network traffic. The techniques also provide this information with a per flow granularity and provide further granularity that allows for analysis of specific features and/or particular hops (i.e., network devices).

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

What is claimed is:

1. A method comprising:
receiving, at a network device that is a part of an end-to-end path in a network, a template that specifies unique information elements to be added to a header of a packet traversing the network device when different combinations of network features are applied to the packet at the network device, wherein each unique information element corresponds to a particular combination of network features, and wherein the unique information elements are usable to debug the network;
applying one or more of the network features to the packet; and
inserting an information element of the unique information elements into the header of the packet based on the template and the one or more network features applied to the packet so that the header is enriched with information that enables debugging of the network when the packet reaches an egress network device at an end of the end-to-end path, wherein the information element inserted into the header is resolvable to a list of the one or more network features applied to the packet at the network device, and wherein the one or more network features applied to the packet include a first network feature and a second network feature, the information element is a combination of a first information element of unique information elements associated with the first network feature and a second information element of unique information elements associated with the second network feature, and the list obtained by resolving the information element includes the first network feature and the second network feature.

2. The method of claim 1, wherein the unique information elements comprise unique metadata identifiers for different network features and different identifiers of the unique metadata identifiers are assigned to different ones of the one or more network features.

3. The method of claim 1, wherein the first information element is a first prime number, the second information element is a second prime number and the combination is a product of the first prime number and the second prime number.

4. The method of claim 1, wherein the first information element is a first number, the second information element is a second number and the combination is a polynomial that resolves to the first number and the second number.

5. The method of claim 1, further comprising:
evaluating information in the header of the packet;
identifying a trigger condition that is indicative of a network debugging issue or that specifies a feature for debugging based on the evaluating, wherein the inserting is performed based on the identifying of the trigger condition.

6. The method of claim 5, wherein the trigger condition is at least one of a user-specified trigger condition or an event-based trigger condition.

7. The method of claim 5, wherein the information in the header of the packet comprises instructions that are conditionally executed based on the identifying of the trigger condition.

8. The method of claim 1, wherein the header is an in situ operation, administration, and maintenance (iOAM) header.

9. A system comprising:
a plurality of network devices providing one or more end-to-end paths in a network and configured to apply one or more network features to packets traversing the one or more end-to-end paths; and
a controller configured to:
provision the plurality of network devices with a template that specifies unique information elements to be added to a header of a packet from the packets when different combinations of network features are applied to the packet, wherein each unique information element corresponds to a particular combination of network features, and wherein the unique information elements are usable to debug the network; and
cause a network device of the plurality of network devices to insert an information element of the unique information elements into the header of the packet based on the template and network features of the one or more network features applied to the packet at the network device so that the header is enriched with information that enables debugging of the network when the packet reaches an egress network device at an end of one of the end-to-end paths in the network, wherein the information element is resolvable to a list of the network features applied to the packet at the network device, and wherein the one or more network features applied to the packet include a first network feature and a second network feature, the information element is a combination of a first information element of unique information elements associated with the first network feature and a second information element of unique information elements associated with the second network feature, and the list obtained by resolving the information element includes the first network feature and the second network feature.

10. The system of claim 9, wherein the unique information elements comprise unique metadata identifiers for different network features and different identifiers of the unique metadata identifiers are assigned to different ones of the one or more network features.

11. The system of claim 9, wherein the first information element is a first prime number, the second information element is a second prime number and the combination is a product of the first prime number and the second prime number.

12. The system of claim 9, wherein a first network device of the plurality of network devices inserts the first information element into the header, a second network device of the plurality of network devices inserts the second information element into the header, and the first information element and the second information element are combined into a polynomial information element to record the one or more network features on a per hop basis.

13. One or more non-transitory computer readable storage media encoded with software comprising computer executable instructions and when the software is executed operable to:
receive a template that specifies unique information elements to be added to a header of a packet traversing a network device that is a part of an end-to-end path in a network when different combinations of network features are applied to the packet at the network device, wherein each unique information element corresponds to a particular combination of network features, and wherein the unique information elements are usable to debug the network;
apply one or more of the network features to the packet; and insert an information element of the unique information elements into the header of the packet based on the template and the one or more network features applied to the packet so that the header is enriched with information that enables debugging of the network when the packet reaches an egress network device at an end of the end-to-end path, wherein the information element inserted into the header is resolvable to a list of the one or more network features applied to the packet at the network device, and wherein the one or more network features applied to the packet include a first network feature and a second network feature, the information element is a combination of a first information element of unique information elements associated with the first network feature and a second information element of unique information elements associated with the second network feature, and the list obtained by resolving the information element includes the first network feature and the second network feature.

14. The one or more non-transitory computer readable storage media of claim 13, wherein the unique information elements comprise unique metadata identifiers for different network features and different identifiers of the unique metadata identifiers are assigned to different ones of the one or more the network features.

15. The one or more non-transitory computer readable storage media of claim 13, wherein the first information element is a first prime number, the second information element is a second prime number, and the combination is a product of the first prime number and the second prime number.

16. The one or more non-transitory computer readable storage media of claim 13, wherein the first information element is a first number, the second information element is a second number and the combination is a polynomial that resolves to the first number and the second number.

17. The one or more non-transitory computer readable storage media of claim 13, wherein the header is an in situ operation, administration, and maintenance (iOAM) header.

18. The system of claim 9, wherein the header is an in situ operation, administration, and maintenance (iOAM) header.

19. The method of claim 1, wherein the information element records the one or more network features on a per hop basis.

20. The one or more non-transitory computer readable storage media of claim 13, wherein the information element records the one or more network features on a per hop basis.

* * * * *